US005705257A

United States Patent [19]

Froh et al.

[11] Patent Number: 5,705,257

[45] Date of Patent: Jan. 6, 1998

[54] DECORATIVE LABEL

[75] Inventors: Penny Froh, Glenview; Edgar A. Tecun, Chicago, both of Ill.

[73] Assignee: Advantage Molding & Decorating, Inc., Wheeling, Ill.

[21] Appl. No.: 618,613

[22] Filed: Mar. 19, 1996

Related U.S. Application Data

[62] Division of Ser. No. 345,517, Nov. 28, 1994, Pat. No. 5,513,567.

[51] Int. Cl.[6] ........ B32B 9/00

[52] U.S. Cl. ........ 428/195; 428/203; 428/204; 428/207; 428/323; 428/327; 428/542.2; 428/90.8; 427/260; 427/261; 101/170; 101/424.2; 101/490

[58] Field of Search ........ 428/323, 327, 428/204, 908.8, 195, 187, 542.2, 542.6, 212, 203, 207; 156/277, 279, 240; 101/170, 424.2, 490, 491; 427/260, 261

[56] References Cited

U.S. PATENT DOCUMENTS

| | | | |
|---|---|---|---|
| 2,925,354 | 2/1960 | Berardinelli et al. | 117/12 |
| 3,552,986 | 1/1971 | Bassemir | 117/12 |
| 4,551,360 | 11/1985 | Kawajiri . | |
| 4,748,046 | 5/1988 | Kuboki et al. . | |
| 5,022,947 | 6/1991 | Hasegawa et al. | 156/277 |
| 5,513,567 | 5/1996 | Froh et al. | 101/170 |

FOREIGN PATENT DOCUMENTS

| | | |
|---|---|---|
| 143135 | 6/1985 | European Pat. Off. . |
| 90348 | 8/1978 | Japan . |
| 131408 | 10/1979 | Japan . |
| 43988 | 3/1982 | Japan . |

*Primary Examiner*—Patrick Ryan
*Assistant Examiner*—Abraham Bahta
*Attorney, Agent, or Firm*—McAndrews, Held & Malloy, Ltd.

[57] ABSTRACT

A method is provided for using a pad printing device to decorate a base surface with an image. Initially the form of the image is printed on the base surface using a base coat material which has a sufficiently high adhesion with the base surface. An ink image is then printed in registry with the base coat image using an ink which has a sufficiently high adhesion to the base coat material. The image is then printed in registry with the ink image using a top coat material which has a sufficiently high adhesion to the ink. Because each layer of material has a sufficiently high adhesion to the adjacent material, the resulting decorative label has a high adhesion to the base surface.

9 Claims, 2 Drawing Sheets

DECORATIVE LABEL

This is a divisional of application Ser. No. 08/345,517 filed Nov. 28, 1994, now U.S. Pat. No. 5,513,567.

FIELD OF THE INVENTION

The present invention relates generally to the decorations and, more particularly, to a method for producing decorations which meet specified abrasion and adhesion standards.

BACKGROUND OF THE INVENTION

In many industries it is desirable to print labels, decals or designs, collectively referred to as decorations, on materials such as metal, plastic, glass and ceramic. For example, manufacturers of devices such as cellular telephones and portable computers typically decorate their products with their logo, trademark, etc. to build brand recognition and goodwill towards their company. In addition, components such as keyboard keys need to be decorated with letters, numbers and other symbols.

In such applications, the decorations are typically required to meet minimum adhesion and abrasion standards, as specified by the manufacturer. The adhesion standard measures the attraction between the decoration and the component and is typically measured by what is known in the industry as a "tape test". Under this test, a piece of adhesive tape is applied to the decoration and then pealed away from the decoration. The tape is then visually inspected to determine if a portion of the decoration was removed by the adhesive tape. This is a go/no go test in that the decoration fails if any of the decoration is lifted by the tape, whereas it passes if the tape is clean. The level of adhesion required by the manufacturer is thus a function of the tape specified for the tape test.

The abrasion test is used to measure the decoration's resistance to wear. Wear resistance is especially critical in applications such as cellular phones, where the decoration is exposed to a high level of rubbing, e.g. from the user's fingers. The abrasion test is performed using a specific abrasion tester, such as an abrasion wear tester as manufactured by Norman Tool, Inc. of Evansville, Ind. The abrasion wear tester rubs an abrasive material over the decoration at a constant load for a specified number of cycles. Since the load and the abrasiveness of the abrasion material are constant, the amount of material removed by the tester per cycle is function of the hardness of the material being tested. After the decoration has been abraded for the specified number of cycles, it is visually inspected with a magnifying glass to determine if an excessive amount of wear has occurred. Again, this is a go/no go test in that the decoration fails if it is worn to the point where the underlying component is visible through the decoration, whereas the decoration passes if the component is not visible through the decoration.

Traditionally, decorations have been prepared by applying printing ink directly to the component and, in some instances, a layer of top coat material is also applied over the ink. However, as new materials are used to produce components, these traditional decorating methods sometimes fail to meet the abrasion and adhesion standards specified by the manufacturer. Hence, it is desirable to provide decorating method which will meet these standards on a wide variety of materials.

SUMMARY OF THE INVENTION

One or more of the above-noted problems are overcome by initially applying a layer of base coat material over the base surface, the base coat material having at least a specified adhesion to the base surface. The form of the image is then printed over the base coat material with an ink which has at least a specified adhesion to the base coat material. Finally, a top coat material having at least a specified adhesion to the ink is applied over the ink image.

In accordance with one embodiment, the layers of base coat material and top coat material are printed in the form of the image, and the layers of base coat material, ink, and top coat material are printed in substantial registry with one another.

Other objects and advantages of the present invention will become apparent upon reference to the accompanying detailed description when taken in conjunction with the following drawings.

DETAILED DESCRIPTION OF THE PREFERRED EMBODIMENT

Figure 1:
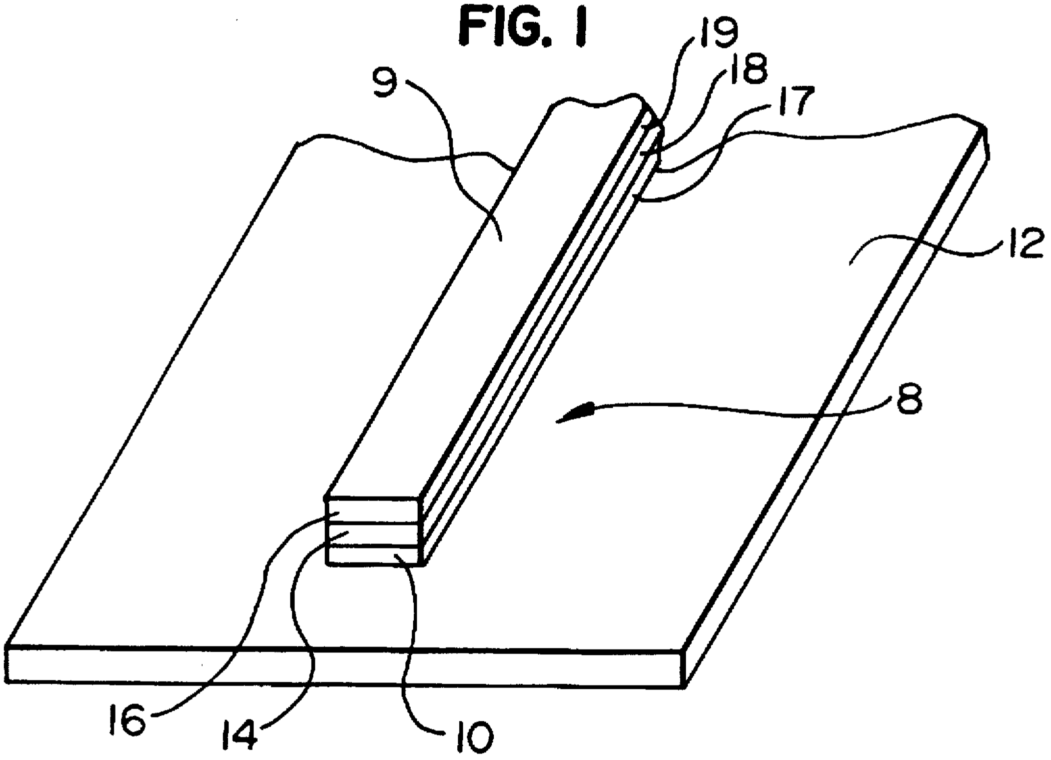
FIG. 1 is a perspective view of a decorative label according to the invention.

The method described herein was developed to allow a surface to be decorated with ink, even though the ink does not bond to the material sufficiently to meet the desired adhesion and abrasion standards. As can best be seen in FIGS. 1 and 2, the method involves printing the desired image, illustrated generally as element 8, in three layers to produce a resulting "sandwiched" decoration 9.

A bottom layer 10 consists of a base coat material which bonds to the component 12, i.e., the base surface, sufficiently to meet the desired adhesion standard. The method described herein has been used to decorate components molded from NORYL (pheneline oxide), a pheneline oxide polymeric material commercially available from G.E. Plastics. When the component 12 is made from NORYL (pheneline oxide), the bottom layer 10 is preferably an acrylate polymer material such as Cashew Hardcoat C-300 which is available from Trans Tech America, Inc. in Carol Stream, Ill. The Cashew Hardcoat C-300 consists of the following chemicals: Dipentaerythritol-petaacrylate (36%); Urethaneacrylate oligomer (17%); Toluene (44%); and Photinitiator (3%). The Cashew Hardcoat C-300 has been found to adhere to Noryl (pheneline oxide) components sufficiently to satisfy the tape test using 3M #600 tape as manufactured by the Minnesota Mining & Manufacturing Co. of St. Paul, Minn.

A middle layer 14 is formed by printing the desired image over the bottom layer 10 using an ink which bonds to the base coat material sufficiently to meet the desired adhesion standard. When the base coat material is Cashew Hardcoat C-300, the ink is preferably an acetate based ink such as pad printing ink type "B" as sold by Trans Tech America, Inc. The type "b" ink consists of the following chemicals: 1-Methoxy-2-Propy-lacetate (10–15%); 2-Butoxyetheyl-acetate (10–30%); Xylene (2%); Solvent Naptha 100 (5%); and Cyclohexanone (5%). Although the "type 'b' ink" does not adhere well when applied directly to the Noryl (pheneline oxide) material, it has been found to adhere to the Cashew Hardcoat sufficiently to satisfy the tape test using 3M #600 tape.

Finally, a top layer 16 is applied over the ink layer 14 using a top coat material which bonds to the ink sufficiently to meet the desired adhesion standard. When type "b" pad printing ink is used, the top coat is preferably Cashew Hardcoat C-300, as described above. The Cashew Hardcoat C-300 is also transparent so that the ink image 18 can be seen through the top coat layer.

Since each layer of material bonds to the adjacent material with a sufficiently high adhesion, the resulting "sandwiched" decoration 9 bonds to the component 12 sufficiently to meet the desired adhesion standard. In particular, the resultant decoration 9 adheres to the component sufficiently to satisfy the tape test using 3M #600 tape. The resultant decoration 9 has also been found to pass a 200 cycle abrasion test on the Norman Tool abrasion wear tester.

Figure 2:
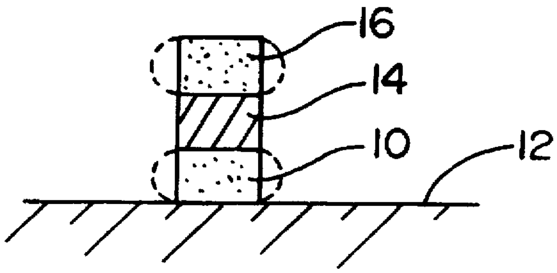
FIG. 2 is a cross-sectional view a decorative label made according to the present invention.

Preferably, the bottom and top layers 10, 16 are printed in the form of the desired image, as illustrated in FIGS. 1 and 2, and the resulting base coat image 17, ink image 18, and top coat image 19, are printed in substantial registry with each other. The term "substantial registry" as used herein means any misalignment between the individual layers is not visible to the naked human eye. When the above specified materials are employed the top and bottom layers 10, 16 actually appear as illustrated in broken lines in FIG. 2 when the decoration 9 is examined under a microscope.

Figure 3:
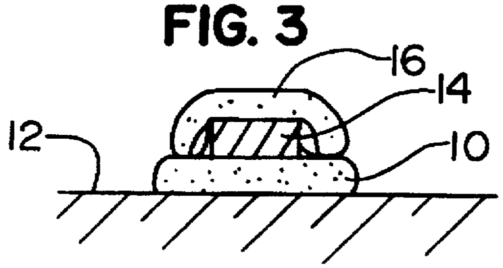
FIG. 3 is a cross-sectional view of a decorative label made according to an alternative method of the present invention.

Alternatively, the bottom layer 10 and the top layer 16 can be applied by other methods, such as spraying or brushing. If this alternative method is employed there is not substantial registry between the layers. Rather, the top layer 16 and bottom layer 10 extend around the middle layer 14 and bond to each other, as illustrated in FIG. 3. This alternative method is less desirable because the resulting decoration is less aesthetically pleasing than a decoration in which the individual layers are printed in substantial registration.

Pad printing, which is also referred to as tampon printing, is ideal for performing this method; however, other printing methods, such as screen printing, may also be employed. A suitable pad printing device for performing the above method is a Model TT/TS 80/100/41 tampon printing device as manufactured by Tampoprint GMBH of Germany. This device is subject to U.S. Pat. No. 4,060,031, entitled "Printing Method And Apparatus For Performing The Printing Method", the disclosure of which is hereby incorporated by reference.

Figure 4:
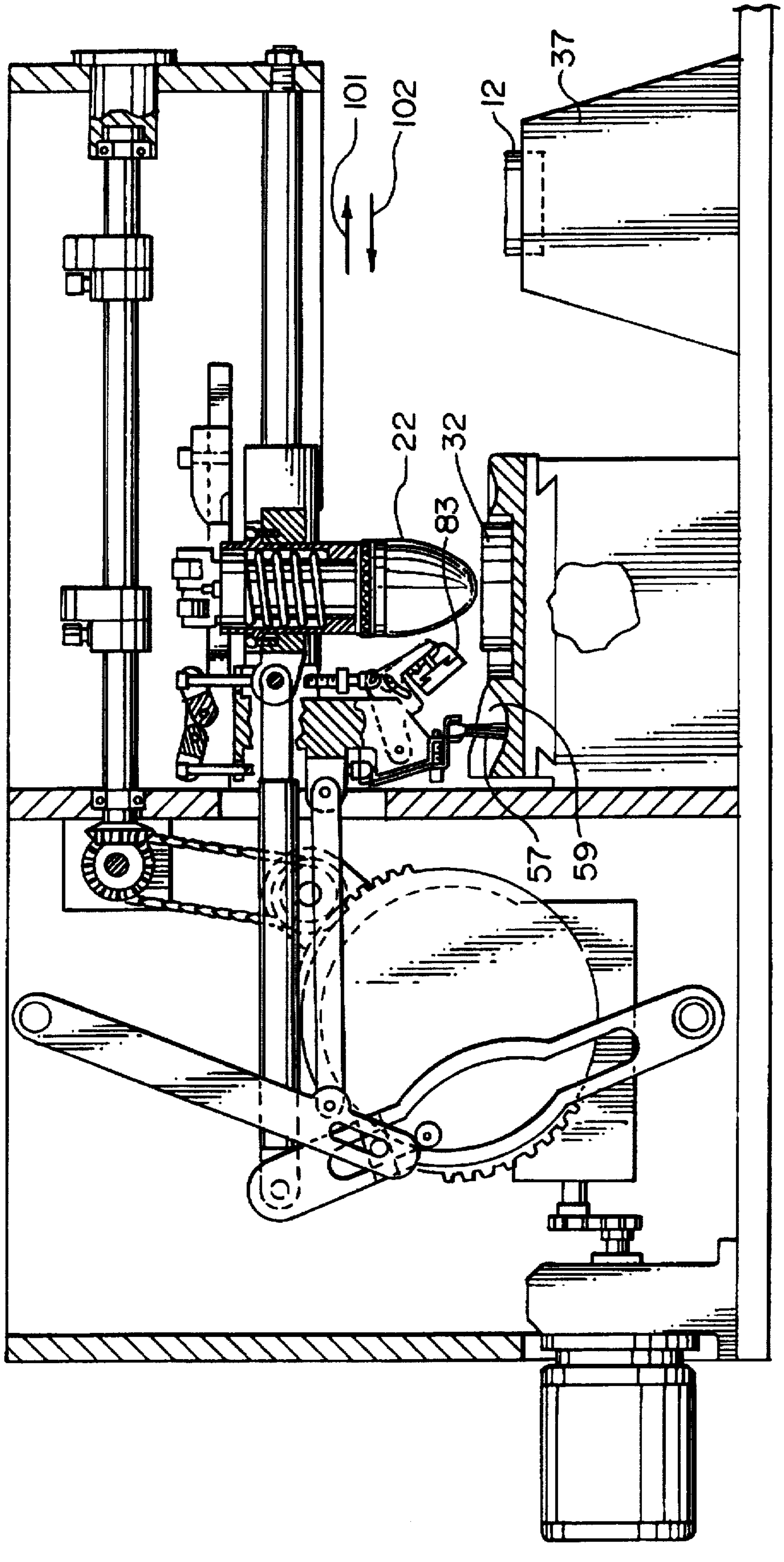
FIG. 4 PRIOR ART
FIG. 4 illustrates a prior art pad printing device which can be used to make decorative labels according to the invention.

Referring to FIG. 4, which corresponds to FIG. 1 from the '031 patent, the pad printing device 20 generally includes a printing pad 22, an intaligo matrix 32 also referred to as a cliche, a print carrier or fixture 37, a brush 57, an ink container or reservoir 59, and a doctor blade 83. The matrix is made from a metal such as steel and is provided with a negative etching of the desired image, as is conventional in the art.

The brush 57 initially slides across the matrix 32 in the direction of the arrow 101 to apply a printing medium, i.e., either the base coat material, the ink, or the top coat material, to the matrix 32 from the reservoir 59. The brush 57 then slides back over the matrix 32 in the direction 102 pushing the excess print medium into the reservoir 59. The doctor blade 83 also slides over the matrix 32 in the direction 102 to scrape off the excess print medium so that the print medium is located only in the etched-in grooves of the matrix 32.

The printing pad 22 is pressed down upon the "inked" matrix 32 to accept, i.e. lift, the print medium from the matrix 32. The print pad 22 then raises and moves laterally in the direction 101 until it is in position above the component 12 carried by the fixture 37. The fixture 37 is constructed from a rigid material, such as steel or aluminum, and is manufactured to high tolerances to maintain the position of the component relative to the printing device 20, thereby ensuring substantial registration between the various levels 10, 14, and 16 of the decoration. While the '031 patent is admittedly prior art to the present application, it is to be appreciated that the '031 patent does not disclose or teach a method for precisely fixturing the component 12 to ensure substantial registry of a multiple level decoration, as described herein.

Once the printing pad is in position over the fixture 37, it lowers and presses down upon the component 12 to transfer the image to the component 12. The printing pad 22 then raises and returns towards the matrix 32 to again accept the print medium from the matrix 32. As the printing pad 22 cycles from the matrix 32 to the fixture 37 and then back to the matrix 32, the brush 57 and doctor blade 83 move as described above to "re-ink" the matrix 32 with the printing medium.

Referring additionally to FIGS. 1 and 2, the method of using the pad printing device 20 to form a layered decoration is described in greater detail. Initially the pad printing machine 20 is set up, i.e., adjusted, so that the image 8 is printed in the desired location when the component 12 is mounted in the fixture 37.

Once the set up is complete, the reservoir 59 is filled with the base coat material. The component 12 is then placed in the fixture 37 and the pad printing device 20 is cycled to print the image 8 on the component 12 with a base coat material.

The base coat image 17 is then cured, preferably by exposing it to a predetermined level of ultraviolet ("UV") light for a predetermined duration sufficient to substantially harden the base coat. The curing step is performed by removing the component 12 from the fixture 37 and placing it in a fusion-type UV oven (not shown) to evaporate the solvent, i.e. the toluene, from the acrylate polymer material. A suitable ultraviolet (UV) oven for performing this step is manufactured by Fusion Systems. When a Fusion System UV oven is used, the UV base coat material is cured by positioning the component approximately 2 inches from the UV bulb for 5 to 10 seconds.

While the base coat image 17 is being cured, the pad printing device 20 is thoroughly cleaned in preparation for printing the desired image 8 with ink. For efficiency, a batch of components are printed with the base coat material prior to printing the ink image 18.

Once the printing device is thoroughly cleaned, the reservoir 59 is filled with the printing ink. The component 12 is the placed back in the fixture and the ink image 18 is printed over the top of the base coat image 17. The ink image is then dried, preferably by removing it from the fixture 37 and allowing it to air dry for a specified period. When the type "b" ink is used the ink image is allowed to dry for approximately 36 hours.

While the ink image 18 is drying, the printing device 20 is cleaned and then the reservoir 59 is filled with top coat material in preparation for printing the top coat image 19. Once the ink image 18 is sufficiently dry, the component is again positioned in the fixture 37 and the printing device 20 is cycled to print the top coat image 19 in substantial registry over the ink image 18. The component 12 is then removed from the fixture and passed through the UV oven to cure the top coat image 19.

To ensure substantial registry between the base coat, ink, and top coat images 17–19, it is critical that the set up of the pad printing device 20 is not disturbed between the printing cycles. In addition, as was mentioned above, it is critical that the fixture 37 be constructed from a rigid material, such as steel or aluminum, and that the fixture be manufactured to high tolerances to maintain the position of the component relative to the printing device 20.

Although the present invention has been described with reference to a specific embodiment, those of skill in the art will recognize that changes may be made thereto without departing from the scope and spirit of the invention as set forth in the appended claims.

We claim as our invention:

1. A decorative label disposed on a base surface and illustrating a preselected image, the decorative label comprising:

b) a base coat image printed in the form of the preselected image on the base surface using a base coat material;

d) an ink image printed over the base coat image, the ink image being in the form of the preselected image and being in substantial registry with the base coat image; and c) a top coat image printed over the ink image using a top coat material, the top coat image being in the form of the preselected image and being in substantial registry with the ink image.

2. A decorative label as set forth in claim 1, wherein the base coat material adheres to the base surface, the ink adheres to the base coat and the top coat material adheres to the ink.

3. A decorative label as set forth in claim 2, wherein the base coat image and top coat image are printed with the same material.

4. A decorative label as set forth in claim 3, wherein the base coat and top coat are acrylate polymer material.

5. A decorative label as set forth in claim 1, wherein the base surface is pheneylene oxide polymeric material, the ink is acetate based ink, and the base coat and top coat materials are both acrylate polymer material.

6. A decorative label as set forth in claim 1, wherein curing the layer of base coat material is cured prior to printing the ink image by exposing the layer of base coat material to ultraviolet light.

7. A decorative label as set forth in claim 1, wherein the layers of base coat material ink and top coat material are all applied by a pad printing device.

8. A decorative label disposed on a base surface of pheneylene oxide polymeric material and illustrating a preselected image, the decorative label comprising:

b) a base layer of acrylate polymer material printed in the form of the preselected image on the base surface;

d) a middle layer of acetate based ink printed in the form of the preselected image and being in substantial registry with the base coat image; and c) a top layer of acrylate polymer material printed in the form of the preselected image and being in substantial registry with the ink image.

9. A decorative label as set forth in claim 8, wherein the layers of base coat material ink and top coat material are all applied by a pad printing device.

* * * * *